May 5, 1970 B. G. COHEN 3,510,693

SEMICONDUCTOR DIODE COUNTING APPARATUS

Filed June 19, 1967

INVENTOR
B. G. COHEN
BY H. W. Lockhart
ATTORNEY

United States Patent Office 3,510,693
Patented May 5, 1970

3,510,693
SEMICONDUCTOR DIODE COUNTING APPARATUS

Barry G. Cohen, Berkeley Heights, N.J., assignor to Bell Telephone Laboratories, Incorporated, Murray Hill and Berkeley Heights, N.J., a corporation of New York
Filed June 19, 1967, Ser. No. 647,041
Int. Cl. H01l *9/10*
U.S. Cl. 307—287 11 Claims

ABSTRACT OF THE DISCLOSURE

A semiconductor diode with a P-I-N structure, in which the I zone contains many trapping levels, is used as a pulse counter with prescribed time delay. Forward voltage pulses are applied to the diode; the resulting current output is appreciable only after a prescribed number of pulses, after a prescribed time delay, have been applied to the diode.

Background of the invention

This invention relates to semiconductor diode signal translating devices, and a particular, pulse counters or frequency dividers with adjustable prescribed delay.

It has been known that semiconductor diodes with a P-I-N structure will not conduct appreciable current when forward voltage is applied, until a certain voltage is exceeded. The forward voltage at which appreciable current starts to flow through the diode is called the "turn-on" voltage because almost immediately after this voltage is applied to the diode, current flows more easily through the diode. On the other hand, if the I (intrinsic or nearly intrinsic) zone contains an appreciable concentration of traps due to certain impurities or imperfections, then the value of this "turn-on" voltage depends during earlier times within less than the time required for the traps to reach thermal equilibrium, that is, of the order of the thermal relaxation time of the traps. Thus, the diode in effect remembers what voltages have been previously applied to it. This effect (memory) has been considered a disadvantage in the reproducibility of turn-on voltage. According to this invention, however, this memory property is utilized to make the diode act as a counter, in which the P-I-N diode "turns-on" only after a certain predetermined number of prescribed forward voltage pulses have been applied successively within a certain time period. This predetermined number in turn can be varied by varying the height or width of each voltage pulse, or the time interval between the pulses.

In one specific embodiment of this invention, a signal pulse generator is connected in series with the P-I-N diode, together with an output load resistor of suitable resistance to serve as a monitor of current in the diode. The signal voltage is applied to the diode by the signal pulse generator, and the resulting voltage across the output load resistor is proportional to the current in the diode.

Likewise, this device may be used as a frequency divider, in effect, merely by utilizing the counting property above-described. In this application, the signal to be frequency divided is fed to the diode as a sequence of voltage pulses, all in the forward direction with respect to the P-I-N diode structure; the output of the diode will then be a sequence of current pulses, but of a lower frequency equal to the signal frequency divided by a predetermined number equal to the corresponding counting characteristic.

On the other hand, the same device may be used as a pulse delay element by taking advantage of the fact that there is a delay in the device's "turning-on" and allowing appreciable current to flow, after the "turn-on" voltage is applied. This delay can be varied by varying the shape and magnitude of the applied voltage pulse, its width, and its repetition rate. Further, frequency division can be combined with pulse delay to achieve simultaneous frequency division and phase delay.

An object of this invention is a semiconductor diode counting apparatus.

A further object of this invention is a semiconductor frequency divider apparatus.

Another object of this invention is a semiconductor pulse delay element.

Another object of this invention is a semiconductor frequency divider or pulse counting apparatus, combined with delay.

Detailed description

This invention, together with its objects, features, and advantages, may be more fully understood from the following detailed description when read in conjunction with the accompanying drawing in which.

Figures 1, 2, 3:
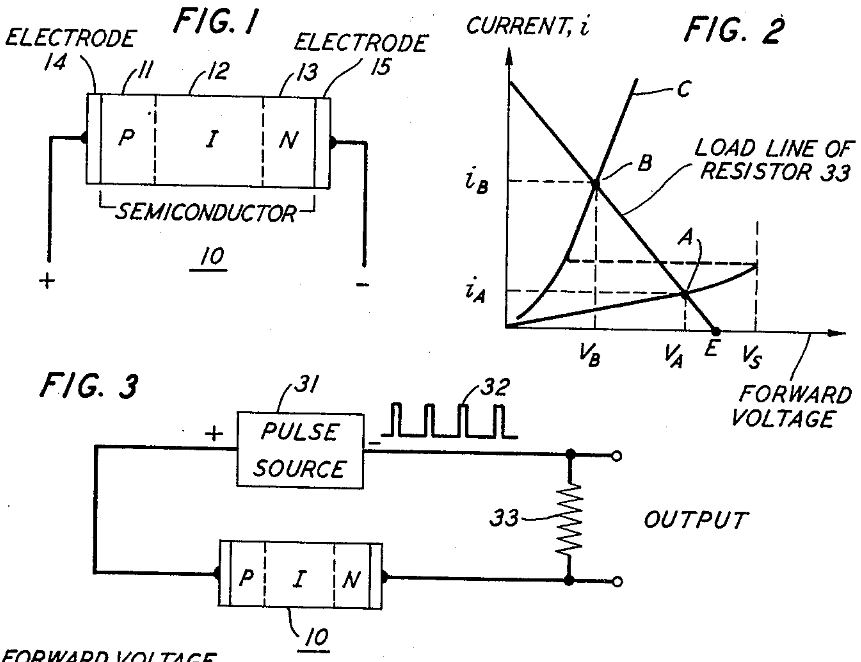
FIG. 1 shows a semiconductor diode, not to scale, suitable for incorporation in the apparatus of FIG. 3.
FIG. 2 is a typical plot of current vs. forward voltage for the semiconductor diode of FIG. 1 for a given history of applied voltages, together with a load line.
FIG. 3 is a schematic representation of apparatus suitable for pulse counting and frequency division, with delay, in accordance with this invention.

In connection with the drawing, the symbols P, I, and N denote the various zones of impurity type conductivity in the semiconductor. Here, P denotes P-type conductivity produced by a net acceptor impurity concentration in the range of $10^{17}$ to $10^{20}$ acceptor impurities per cm.$^3$. Likewise, N denotes N-type conductivity produced by a net donor concentration in the range of $10^{17}$ to $10^{20}$ donor impurities per cm.$^3$. Advantageously however, both the P and the N zone are made to contain about $10^{19}$ or $10^{20}$ net significant impurities per cm.$^3$, for good contact and injecting properties. Additionally, I denotes intrinsic, or nearly intrinsic, type conductivity; but it should be understood that, in the practice of this invention, the I zone also requires a moderate concentration of deep traps, in the range $10^{17}$ to $10^{19}$ per cm.$^3$. However, the concentration of these traps in the I zone should always be understood to be less than the net concentration of significant impurities in at least one of the P or N zones. Also, the net concentration of significant impurities in the I-zone, apart from the traps, should be understood to be less than the concentration of the traps themselves, advantageously by an order of magnitude. As is understood in the art, deep traps are produced in a semiconductor by impurities which yield impurity levels deep in the energy band gap of the semiconductor, that is at a "distance" (in the energy sense) from both the band gap edges of at least about 10 $k$T, where $k$ is Boltzmann's constant (1.38 joules per degree Kelvin) and T is the Kelvin temperature.

FIG. 1 illustrates the semiconductor diode element 10 to be used in the practice of this invention. This element 10 comprises zones 11, 12, and 13 in a semiconductor body, with highly conductive electrode layers 14 and 15 for external electrical contact. Zone 11 is of P-type impurity conductivity; zone 12 is of intrinsic or nearly intrinsic conductivity and containing the above-mentioned concentration of deep traps; and zone 13 is of N-type impurity conductivity. Typically the semiconductor material is gallium arsenide, but may be silicon, germanium, or other semiconductor material with deep traps. Advantageously, the highly conductive electrode layers 14 and 15 are of metal or degenerate semiconductive material.

The graph of FIG. 2 shows a typical curve C of current vs. forward voltage, depicting the characteristic of the element 10 used in the practice of this invention. It is to be understood that this curve C is not fixed, but depends upon the past history of applied voltages to the diode 10. The "load line" will be explained below in the discussion of FIG. 3. What is important here is the "snap-back" characteristic, that is, as the forward voltage is increased appreciable current does not flow until a certain ("snap-back") voltage denoted by $V_s$ in FIG. 2 is applied across the diode. After this voltage $V_s$ is attained, the voltage across the diode 10 suddenly drops as shown in FIG. 2, due to lower effective resistance of this diode. The condition of the diode 10 after this so-called "snap-back" voltage, $V_s$, has been applied is called the "turn-on" condition. For given pulse height E, appreciable currents will then flow through the diode 10 in this "turn-on condition," which is attained when $V_s$ falls to a value on or below the load line 33. In accordance with the practice of this invention, this snap-back voltage, $V_s$, and the curve C itself depend upon the past history of voltages applied across the diode 10 during earlier times within less than of the order of the thermal relaxation time of the traps. This memory property may be utilized to count a train of voltage pulses, as will now be described.

It should first be emphasized that, since the diode 10 is sensitive to light as are most semiconductor devices, for reproducibility of results it is necessary that lighting conditions be kept constant. Advantageously, the diode 10 is kept in total darkness during all operations in this invention in order to ensure reproducibility of the counting property. On the other hand, this sensitivity to light may be utilized to control the counting and the delay, by controlling the lighting conditions.

FIG. 3 is a schematic representation of a circuit suitable for pulse counting with time delay, in accordance with this invention. A source 31 of voltage signal pulses of the form shown generally at 33 is connected in series with the diode 10, together with an output load resistor 33. When the voltage pulse of magnitude E is applied, two stable operating points in the circuit are possible as illustrated in FIG. 2, namely at the intersections A and B, of the "load line" of the resistor 33 with the characteristic curve C of the diode. It should be understood that the slope of this load line is the negative reciprocal of the resistance of the resistor 33, and this load line intersects the abscissa at a voltage equal to E, so that the voltage across the diode 10 plus the voltage across the resistor 33 add up to E, the pulse voltage of the source 31. If the diode 10 is in the "turn-on" condition when the pulse E is applied the current will correspond to its relatively large value $i_B$ at B; otherwise, when the pulse E is applied the current will correspond to its relatively small value $i_A$ at A. Likewise, the voltage across the output resistor 33 is equal to $(E-V_B)$ when the diode 10 is in the "turn-on" condition, and to $(E-V_A)$ otherwise. The current in the resistor 33 is the same as that in the diode 10 due to the electrical series connections. Thus the voltage $(E-V_A)$ or $(E-V_B)$ across the output resistor is a measure of the current $i_A$ or $i_B$ in the diode 10 as follows from Ohm's law:

$$i_A=\frac{E-V_A}{R} \tag{1A}$$

or $$i_B=\frac{E-V_B}{R} \tag{1B}$$

where R is the resistance of the resistor 33. It is clear, from FIG. 2, that R must be suitably chosen such that, for the pulse voltage of magnitude, E, the load line (of slope equal to the negative reciprocal of R) indeed intersects the characteristic curve C of the diode in two stable operating points A and B. Provided R is suitably chosen, this requirement can be satisfied for all reasonable values of E. Thus, $i_A$ will generally be much smaller than $i_B$, the current when the diode 10 is in the "turn-on" condition in FIG. 3.

Figure 4:
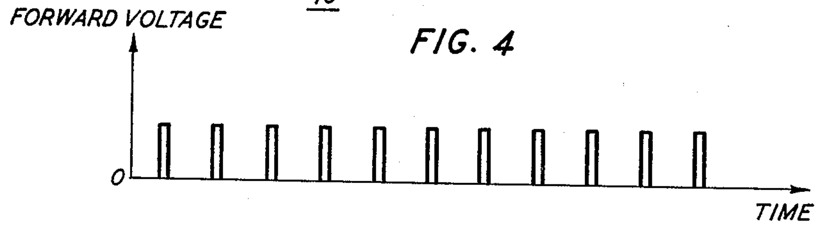
FIG. 4 shows a voltage vs. time plot of a typical pulse train as supplied by the pulse source of FIG. 3.
Figure 4A:
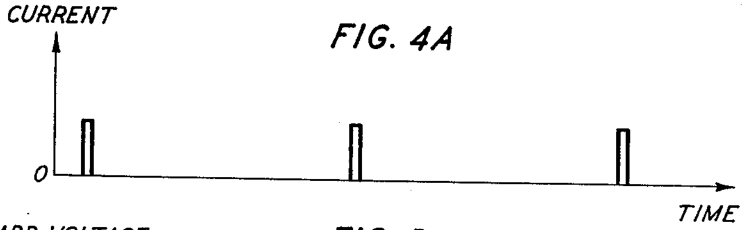
FIG. 4A shows the output current of the apparatus shown in FIG. 3 in response to the voltage as supplied in FIG. 4, in accordance with one aspect of this invention.

On the other hand, the question as to whether or not the diode 10 in the circuit of FIG. 3 is in the "turned on" condition depends upon the past history of the voltages applied to this diode 10. In particular, FIG. 4A shows a typical case of the current in the circuit of FIG. 3, caused by a train of approximately equal forward voltage pulses equally spaced in time supplied to the circuit by the pulse source 31, as shown in FIG. 4. Here the diode 10 is spoken of as "counting by five," in that the "turn-on" condition is reached only on every fifth pulse. Stated in another way, appreciably higher current (corresponding to $i_B$ above, as measured for example by the voltage across resistor 33) flows in the circuit only during each and every fifth voltage pulse. By varying the height E, width or shape of the pulse source 31, or the repetition rate, or the resistance of the resistor 33 or, in general, any of the other parameters involved, the diode 10 can count by any desired number, $n$ ("counting number"). In practice, however, the higher this "counting number" $n$, the more sensitive the device becomes to uncontrollable fluctuations. Counting numbers as high as twenty have been achieved in the actual practice of this invention, where only on each and every twentieth voltage pulse does appreciable current flow in the circuit.

Figure 5:
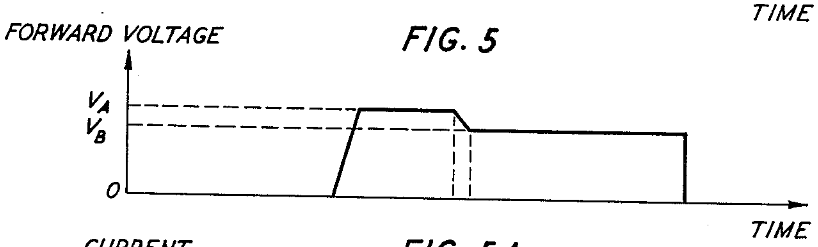
FIG. 5 is a plot of the voltage across the diode, in response to the voltage supplied as in FIG. 4 but with the time scale expanded, in accordance with another aspect of this invention.
Figure 5A:
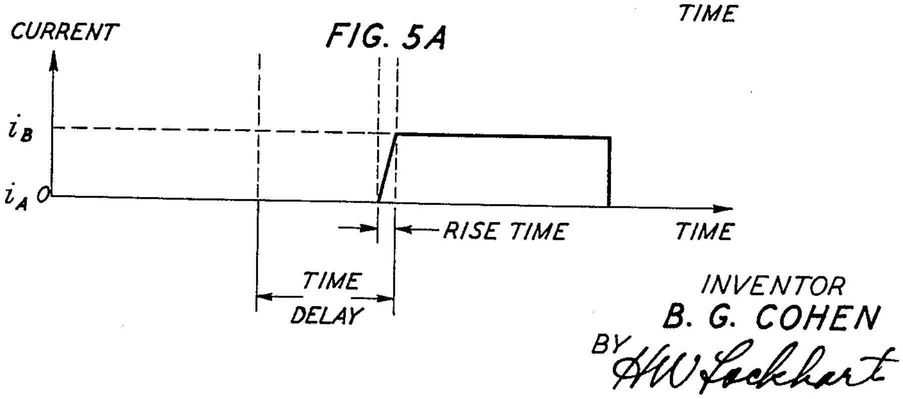
FIG. 5A is a plot of the output current of the apparatus, as in FIG. 4A, likewise with the time scale expanded, in accordance with another aspect of this invention.

FIG. 5 shows one of the $n$th voltage pulses, appearing across the diode 10 in response to the voltage supplied as in FIG. 4, but in greater detail, by expansion of the time scale abscissa. In FIG. 5, it is during this voltage pulse $n$ that the diode reaches its "turn-on" condition and allows appreciable curent $i_B$ to flow, as shown in FIG. 5A. Here in FIG. 5A, $i_A$, the current in the absence of "turn-on" condition, is assumed to be negligible compared with $i_B$; however, this is not necessary for successful operation, so long as $i_B$ is sensibly greater than $i_A$. The current in FIG. 5A becomes appreciable only after a time delay after the said voltage pulse is applied. This time delay itself can be varied for a given diode 10, by changing the parameters, such as the height E, shape or width of the voltage pulse, or its repetition rate. Thus, in addition to allowing appreciable current to flow only during the $n$th voltage pulse, the diode 10 passes this current only after a controllable time delay, as indicated in FIG. 5A. Also, there is a finite time during which the current is increasing, as indicated in FIG. 5A by "rise time."

EXAMPLE 1

The starting semiconductor material for a diode 10 was high resistivity gallium arsenide wafer, uniformly of approximately 1 megohm-cm. resistivity at room temperature. This material was made by float-zone refining of polycrystalline gallium arsenide which purposely was not doped with impurities but contained traps in moderately high concentration, as is known in the art. The float-zone refined gallium arsenide has an energy gap of about 1.4 electron volts together with traps at a "distance" of about 0.6 electron volt below the conduction band edge and about 0.8 ele tron volt above the valence band edge.

Zinc, the acceptor impurity for zone 11, was deposited upon and diffused into two opposite sides of a relatively thick slice (about 0.5 mm.) to an appreciable depth (25$\mu$ to 100$\mu$). This slice was then ground and etched on one of its said sides until only a relatively thin layer, about 100$\mu$, of exposed semi-insulating gallium arsenide remained. The opposite side containing the diffused zinc serves as zone 11, upon which was deposited a conductive electrode layer 14, typically metallic nickel, for external electrical contact. To make the N-zone 13, pure tin was evaporated onto the exposed semi-insulating layer through a metal evaporation mask which was perforated with small holes (about 150$\mu$ in diameter). The tin was then advantageously alloyed at approximately 500° C., in forming gas, a mixture of 85 percent nitrogen with 15 percent hydrogen. This latter process results in the formation of the N zone 13 together with a highly conducting layer 15 of tin, serving as an electrode for external electrical contact. Mesa etching through a suitable mask was then used to outline and reduce the cross-section of the diode 10 to a diameter of about one-tenth millimeter.

It was found that with the diode 10 as thus prepared, and placed in total darkness at room temperature, in a circuit as shown in FIG. 3, with the resistance of the resistor 33 equal to 10,000 ohms; the diode 10 would count by five (i.e., $n=5$) when the voltage pulse source furnished pulses of magnitude equal to about 50 volts, at a repetition rate of 0.5 pulse per second (one pulse every two seconds) with a pulse width of about 50 milliseconds. The current when the diode 10 was in the "turn-on" condition was about 0.8 milliampere, with a time delay (as indicated in FIG. 5A) of about 9 milliseconds after the start of every voltage pulse during which the "turn-on" condition was attained (i.e., every fifth pulse). The rise time, as indicated in FIG. 5A, was less than 1 millisecond.

By variation of the voltage source pulse width, height, and repetition rate, this diode was made to count by any number between 1 and 10 inclusive. The repetition rate was in the range of one to 100 pulses per second.

EXAMPLE 2

Another diode was prepared exactly as in Example 1, except that the relatively thin layer of semi-insulating gallium arsenide remaining immediately after grinding and etching of one side of the wafer was about 25$\mu$ instead of 100$\mu$. Again for example, when placed in the circuit as sketched in FIG. 3 at room temperature and in total darkness, this diode 10 would count by 10 (i.e., $n=10$) when the voltage source supplied a pulse of height equal to about 6 volts, with a pulse width of about 0.7 microsecond, at a pulse repetition rate of 1000 pulses per second. This diode could also count successfully at pulse repetition rates between 100 per second and 10,000 per second and for voltage pulse widths from less than 1 microsecond to more than 10 microseconds. However, in this example, inasmuch as the pulse repetition rate is so much greater than in Example 1, the rise time seemed to be affected by the circuit configuration as well as the diode 10 itself.

Theory

In seeking an explanation of the mechanism of operation of the diodes above-described, it was found that the diode of Example 1 operating in the unity counting mode (i.e., $n=1$) showed the interesting property that, for fixed voltage pulse width and height, the time delay showed a maximum at a repetition rate of about 2 pulses per second. This time delay steadily decreased for pulse repetition rates greater than 2 per second and for pulse repetition rates less than 2 per second. This indicates that there are at least two mechanisms of differing time constants which tend to reset the diode from the "turn-on" condition once it is produced. It is believed that one of these mechanisms involves the readjustment of the distribution of empty and filled traps in the I-zone 12, by diffusing of charge carriers; and the other mechanism involves the tendency to equilibrium, by reason of thermal relaxation. While the equilibrium produced by thermal relaxation involves a non-uniform spatial distribution of empty vs. filled traps (due to P and N zones 11 and 13), trap readjustment tends toward spatial uniformity, thereby distinguishing the effect of these mechanisms on the conductivity.

It is further believed that the moderately high density of deep traps produces a trapping band deep within the energy band gap, just as a high density of donor or acceptor levels produces an impurity band near the corresponding edge of the energy band gap. This trapping band thus allows for easy diffusion of charge carriers within this band itself. The required time for trap readjustment by diffusion is substantially less than the equilibrium time due to thermal relaxation.

After being in its "turn-on" condition, the diode can more easily (i.e., with lower applied voltage) be forced again into its "turn-on" condition just after a reasonable number of traps have undergone readjustment by diffusion but before thermal relaxation has had a chance to produce equilibrium. Thus, the voltage required across the diode, to produce its "turn-on" condition, depends upon the past history of applied voltages within less than of the order of the thermal relaxation time.

According to this theory, for successful counting the time between $n$ pulses must be approximately equal to a time between two values $t_1$ and $t_2$, where $t_1$ is the time required for a reasonable number of traps to readjust, and $t_2$ is the relaxation time. Thus, since $t_1$ is governed by a diffusion process, it is expected from elementary diffusion theory that this time $t_1$ will be proportional to the square of the width of the I-zone 12, in which the traps predominate. Hence the upper bound for the pulse repetition rate, of the order of the reciprocal of $t_1$, varies roughly as the reciprocal of the square of the width of the I-zone 12 for given pulse width and heights. This roughly held true for Example 1 compared with Example 2 even in which the pulse width and heights were not the same: the width of the I-zone 12 was decreased by a factor of 4 (100$\mu$÷25$\mu$), while the upper bound for the repetition rate increased by a factor of 100 (10,000 per second÷100 per second). Thus, successful diodes for still higher repetition rates may be made by reducing the width of the I-zone 12 in Example 2 still further down to say 6$\mu$. In such a case, epitaxial growth of gallium arsenide doped with chromium, oxygen or manganese in the epitaxial gas, to yield the traps, on a P-type gallium arsenide substrate (serving as zone 11) would be advantageous, in order to control such a small width of zone 12. The N zone 13 together with the metal electrode layer 15 could then be made as in Example 1 with the metal tin. However, it should be understood that there is a lower limit to the width of I-zone 12, because as this zone 12 is made thinner overall the diode begins to operate like an ordinary P-N junction with its space-charge region penetrating the whole of zone 12. Also, as the width of I-zone 12 is made smaller, effectively this reduces the thermal relaxation time $t_2$ due to tunnelling and edge injection effects, so that ultimately $t_1=t_2$ and there is no range of successful counting repetition rates available for diodes of the P-I-N structure when the width of the I-zone is too small. Since the space-charge region has a width of the order of one-half micron in P-N junctions, it is reasonably certain that I-zones 12 of substantially smaller width than one-half micron will not yield any successful counting diodes.

Application to frequency division with phase delay

The apparatus shown in FIG. 3 which counts pulses with a time delay, as illustrated in FIGS. 4, 4A, 5 and 5A, can be used as a frequency divider with phase delay. For example, with the diode 10 counting pulses by $n$, the frequency of the output is effectively one-$n$th that of the source. Additionally, there is a phase delay in the output equal to the time delay of the diode 10 (on the $n$th pulse) multiplied by $2\pi$ times the frequency.

In the practice of the invention in this aspect of frequency division with phase delay, an input signal of the frequency desired to be divided drives the pulse generator 31 at a repetition rate equal to this input frequency, by methods known in the art. The other parameters, such as pulse width, height, or shape are adjusted so that the counting number $n$ is equal to the desired frequency divisor, that is to say, the ratio of the desired output frequency to the input frequency. Also, these parameters are adjusted so that the time delay of the diode 10 on the $n$th pulse is equal to $2\pi$ divided by the desired phase delay. The output of the load resistor 33 will then be a sequence of pulses at a repetition rate equal to the desired output frequency. This output sequence of pulses may then be converted into an output signal of the desired frequency with the desired phase delay, by methods known in the art, thereby accomplishing the desired frequency division with phase delay.

Further considerations for other semiconductor materials

Although the above examples have been given for diodes 10 made of semi-insulating gallium arsenide for the I-zone 12, including a moderate concentration of deep traps therein, it may be possible to use other semiconductor materials with deep traps for fabricating the diodes. It is known in the art, for example, that the semiconductor silicon, doped with gold or iron, can be made to have a closely controllable concentration of deep traps, even more controllable than gallium arsenide produced by the float-zone refining technique. Thus, the I-zone 12 could be made of silicon containing a concentration of gold or iron atoms in the range of $10^{17}$ to $10^{19}$ per cm.$^3$. The P and N zones 11 and 13 in the silicon could be made by many techniques well known in the art, including diffusion of impurities through suitable masks. However, although the trap readjustment time in silicon is thus more easily controlled through control of the concentration of traps, the thermal release time in silicon at room temperature is much smaller. Thus the lower bound for countable repetition rates is higher. Likewise, in silicon the intrinsic conductivity at room temperature is much greater than in gallium arsenide thereby masking the trap readjustment effects. These factors of lower thermal release time and higher intrinsic conductivity thus both tend to deteriorate the pulse counting property of silicon diodes with P-I-N structure at room temperature. However, the more closely controllable trap concentration offers the possibility of improvement, by control of the trap readjustment time (determined in part by the trap concentration). Also, by making the silicon diode's I-zone 12 thinner, the trap readjustment time can also be made smaller while the thermal release time stays constant, thus improving the pulse counting property, so long as this I-zone 12 does not approach the width of the ordinary P-N junction as discussed above under Theory.

Likewise germanium might also be used for the diode 10. For traps, copper and gold are suitable impurities in germanium for the I-zone 12. The P and N zones 11 and 13 can be made in germanium by many techniques well known in the art. However, germanium has an even lower energy band gap than silicon and so has a still lower thermal release time. Furthermore, at room temperature in the present state of the art germanium does not have a resistivity above 50 ohm-cm. at room temperature no matter how high the trap concentration; and so at room temperature at least, germanium is less promising than silicon due to the intrinsic conductivity's hiding the traps' resistance, and thereby making the "snap-back" voltage characteristic very hard to detect. At lower temperatures, however, germanium in addition to silicon advantageously may be used as the material for the diode 10 in the practice of this invention.

Although the diode 10 to be used in the practice of this invention has been described in terms of the deep trap concentration in I-zone 12 being less than the net predominant impurity concentration in the P-zone 11 or the N-zone 13, it may be possible to fabricate successful diode counting devices having the net predominant impurity concentration in either zone 11 or zone 13 (but not both) somewhat smaller than the trap concentration in zone 12. The reason for this is that only one good junction between the I-zone 12 and the zones 11 and 13 may be required for injection of charge carriers into I-zone 12 during the "turn-on" condition.

The width of the P and N zones 11 and 13 need only be large enough to correspond to the width of the space charge regions therein, of the order of one-tenth micron, as is known in the art. However, for mechanical strength of the diode and ease of handling, especially when the I-zone 12 is made smaller than about $25\mu$, it is advantageous to have at least one of the said zones 11 and 13 at least $25\mu$ thick.

Although the donor and acceptor impurities in the above examples were tin and zinc, respectively, in gallium arsenide semiconductor material, many other impurities may be substituted for them, as is well known in the art.

For example, it is known that N-type gallium arsenide may be produced by using the impurities sulfur, selenium, and tellurium, in addition to tin above-described. Likewise, P-type gallium arsenide may be produced by the impurity cadmium, in addition to zinc above-described. Likewise, the deep traps in semiconductors, for I-zone 12, can be produced by a variety of methods and impurities in semiconductors, to yield diodes suitable for incorporation in the apparatus of FIG. 3, within the contemplation of the broadest aspect of this invention.

What is claimed is:

1. A semiconductor pulse counting apparatus comprising:

(a) a semiconductor diode with a P-I-N zone structure;

(b) a layer of highly conductive material on a portion of each of the surfaces of the said P and N zones, thereby furnishing terminals to the diode for external electrical contact;

(c) means for continuously monitoring the current in the diode; and (d) means for applying a sequence of substantially equal forward voltage pulses to the terminals of the diode, such that the current in the diode is greater only for some time during every said predetermined number of pulses than during the remaining pulses.

2. Apparatus in accordance with claim 1 in which the I-zone is float-zone refined gallium arsenide.

3. Apparatus in accordance with claim 2 in which the width of the I-zone is between about 25 microns and about 100 microns.

4. A signal voltage pulse counting device with controllable time delay comprising:

(a) a semiconductor diode with a P-I-N zone structure;

(b) a layer of highly conductive material on a portion of each of the surfaces of the said P and N zones, thereby furnishing terminals to the diode for external electrical contact;

(c) means for continuously monitoring the current in the diode; and (d) means for applying a sequence of substantially equal forward voltage pulses to the terminals of the diode such that the current in the diode is greater only during every said predetermined number of pulses, only after a predetermined time delay, than during the remaining pulses.

5. A semiconductor frequency divider apparatus comprising:

(a) a semiconductor diode with a P-I-N zone structure wherein the I-zone contains a concentration of deep level impurities forming traps in the range of between about $10^{17}$ and about $10^{19}$ per $cm.^3$;

(b) a layer of highly conductive material on a portion of each of the surfaces of the said P and N zones, thereby furnishing terminals to the diode for external electrical contact;

(c) means for continuously monitoring the current in the diode;

(d) means for applying a sequence of substantially equal forward voltage pulses to the terminals of the diode, at a repetition rate equal to the frequency desired to be divided, such that the current in the diode is greater only for some time during every predetermined number of pulses than during the remaining pulses;

6. Apparatus in accordance with claim 5 in which the I-zone is float-zone refined gallium arsenide.

7. Apparatus in accordance with claim 6 in which the width of the I-zone is between about 25 microns and about 100 microns.

8. A semiconductor frequency divider apparatus, with controllable phase delay, comprising:

(a) a semiconductor diode with a P-I-N zone structure;

(b) a layer of highly conductive material on a portion of each of the surfaces of the said P and N zones, thereby furnishing terminals to the diode for external electrical contact;

(c) means for continuously monitoring the current in the diode; and (d) means for applying a sequence of substantially equal forward voltage pulses to the terminals of the diode, at a repetition rate equal to the frequency desired to be divided, such that the current in the diode is greater for some time only during every predetermined number of pulses, only after a predetermined desired phase delay, than during the remaining pulses.

9. The device of claim 8 in which the I-zone is float-zone refined gallium arsenide.

10. The device of claim 9 in which the width of the I-zone is between about 25 microns and about 100 microns.

11. The method of counting every *n*th pulse in a sequence of pulses comprising the steps of:

applying the pulses in the sequence as forward voltages across a semiconductive element which is a P-I-N diode; and detecting the *n*th pulse as an increase in the current through the diode.

References Cited

UNITED STATES PATENTS 3,187,249 6/1965 Jordan ------------- 307—225

OTHER REFERENCES

Physical Review Letters, "Double Injection With Negative Resistance in Semi-Insulators," by Holonyak, pages 426–428, vol. 8, No. 11, June 1, 1962.

JERRY D. CRAIG, Primary Examiner

U.S. Cl. X.R.

307—220, 225, 324; 317—234